(12) United States Patent
van Thiel et al.

(10) Patent No.: US 12,427,650 B2
(45) Date of Patent: Sep. 30, 2025

(54) SUPPORT ASSEMBLY

(71) Applicant: Bear Robotics, Inc., Redwood City, CA (US)

(72) Inventors: Ron van Thiel, Menlo Park, CA (US); Yihan Zhang, San Mateo, CA (US); Gino Nguegang, Belmont, CA (US)

(73) Assignee: Bear Robotics, Inc., Redwood City, CA (US)

( * ) Notice: Subject to any disclaimer, the term of this patent is extended or adjusted under 35 U.S.C. 154(b) by 504 days.

(21) Appl. No.: 17/860,372

(22) Filed: Jul. 8, 2022

(65) Prior Publication Data

US 2023/0011949 A1 Jan. 12, 2023

Related U.S. Application Data

(60) Provisional application No. 63/219,516, filed on Jul. 8, 2021.

(51) Int. Cl.
*B25J 9/00* (2006.01)
*B25J 11/00* (2006.01)

(52) U.S. Cl.
CPC ......... *B25J 9/0009* (2013.01); *B25J 11/0045* (2013.01); *B25J 11/008* (2013.01)

(58) Field of Classification Search
CPC .... B25J 9/0009; B25J 11/0045; B25J 11/008; A47G 2400/086
See application file for complete search history.

(56) References Cited

U.S. PATENT DOCUMENTS

| | | | | |
|---|---|---|---|---|
| 138,598 | A | * | 5/1873 | Winecoff ............... A47C 9/002 5/103 |
| 3,632,076 | A | * | 1/1972 | Rogers, Jr. ............... B60N 2/39 248/371 |
| 5,795,078 | A | * | 8/1998 | Li .......................... F16C 33/40 384/490 |
| 8,662,586 | B2 | * | 3/2014 | Serber .................. A47C 3/0257 297/316 |
| 10,383,445 | B2 | * | 8/2019 | Serber ..................... A47C 9/002 |
| 10,391,899 | B2 | * | 8/2019 | Ketels ...................... B60N 2/39 |
| 11,825,949 | B2 | * | 11/2023 | Collier ............... A47C 1/03261 |
| 11,877,537 | B2 | * | 1/2024 | Hiller ....................... B60N 2/39 |
| 2011/0089733 | A1 | * | 4/2011 | Nishino .................. A47C 3/027 297/258.1 |
| 2019/0045928 | A1 | * | 2/2019 | Yajima .................... A47C 7/006 |
| 2022/0354254 | A1 | * | 11/2022 | Collier ............... A47C 1/03205 |

* cited by examiner

*Primary Examiner* — Saul Rodriguez
*Assistant Examiner* — Brendan P Tighe
(74) *Attorney, Agent, or Firm* — Dinsmore & Shohl LLP; Yongsok Choi, Esq.

(57) ABSTRACT

A support assembly is provided. The support assembly includes: a lower frame configured to be mountable on one surface of a moving object; a guide frame configured such that one end is coupled to an upper surface of the lower frame, and at least a part of another end is curved toward where the lower frame is located; a connection frame configured such that one side includes a plurality of rollers spaced apart at a predetermined interval, and the plurality of rollers slide along the curved part of the guide frame; and an upper frame coupled to another side of the connection frame and configured to move in response to the plurality of rollers sliding along the curved part of the guide frame.

5 Claims, 2 Drawing Sheets

SUPPORT ASSEMBLY

CROSS-REFERENCE TO RELATED APPLICATION

This application claims the benefit of U.S. Provisional Application No. 63/219,516 filed on Jul. 8, 2021, the entire contents of which are herein incorporated by reference.

FIELD OF THE INVENTION

The present invention relates to a support assembly.

BACKGROUND

With the development of robot technology, service robots as well as industrial robots are attracting more attention and demand. The service robots are being applied to various fields of daily life, and among these service robots, autonomously driving serving robots for transporting food ordered by a customer to a table in a restaurant or the like are also known. The serving robots are receiving rapidly increasing attention due to their advantages of maximizing the efficiency of restaurant management and improving the quality of customer service.

FIG. 1 illustratively shows a robot for serving food and/or drinks. Referring to FIG. 1, a robot 10 comprises a drive unit 11 for moving the robot 10 and a main body unit 12 mounted on an upper end of the drive unit 11. The main body unit 12 may be provided with a device to which a user's command may be inputted or a device which may receive a user's command through wireless communication, and may autonomously drive to serve food and/or drinks to a customer or transport dishes after the customer finishes eating, according to the inputted or received command. Further, a tray for serving food and/or drinks or transporting dishes may be disposed at one side of the main body unit 12.

Meanwhile, impact or vibration may be applied to the tray according to a change in speed, direction, or the like of movement while the robot 10 is moving, and the impact or vibration may cause a problem that food and/or drinks placed on the tray may spill or dishes placed on the tray may fall.

That is, the food and/or drinks or dishes may not be stably supported on the tray while the robot 10 is moving, which may cause a problem that the food and/or drinks or dishes may be separated from the tray.

SUMMARY OF THE INVENTION

One object of the present invention is to solve all the above-described problems in the prior art.

Another object of the invention is to compensate for impact or vibration delivered to food and/or drinks or dishes placed on a tray while a serving robot is moving, so that the food and/or drinks or dishes may be stably supported on the tray.

The representative configurations of the invention to achieve the above objects are described below.

According to one aspect of the invention, there is provided a support assembly comprising: a lower frame configured to be mountable on one surface of a moving object; a guide frame configured such that one end is coupled to an upper surface of the lower frame, and at least a part of another end is curved toward where the lower frame is located; a connection frame configured such that one side includes a plurality of rollers spaced apart at a predetermined interval, and the plurality of rollers slide along the curved part of the guide frame; and an upper frame coupled to another side of the connection frame and configured to move in response to the plurality of rollers sliding along the curved part of the guide frame.

According to another aspect of the invention, there is provided a support assembly, comprising: a lower frame configured to be mountable on one surface of a moving object; a first guide frame coupled to an upper surface of the lower frame and provided with a first hole formed to be curved toward where the lower frame is located; a first connection frame configured such that one side includes a plurality of first rollers spaced apart at a predetermined interval, and the plurality of first rollers slide along the first hole; a second guide frame coupled to another side of the first connection frame and provided with a second hole formed to be curved toward where the lower frame is located; a second connection frame configured such that one side includes a plurality of second rollers spaced apart at a predetermined interval, and the plurality of second rollers slide along the second hole; and an upper frame coupled to another side of the second connection frame and configured to move in response to at least one of the plurality of first rollers sliding along the first hole and the plurality of second rollers sliding along the second hole.

In addition, there are further provided other support assemblies to implement the invention.

According to the invention, it is possible to compensate for impact or vibration delivered to food and/or drinks or dishes placed on a tray while a serving robot is moving, so that the food and/or drinks or dishes may be stably supported on the tray.

DETAILED DESCRIPTION OF THE INVENTION

Figure 1:
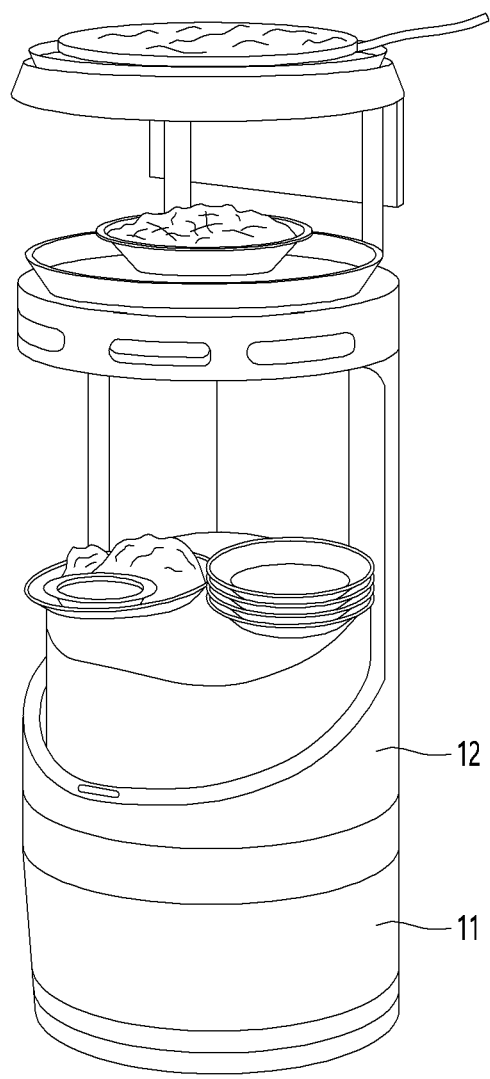
FIG. 1 illustratively shows a robot for serving food and/or drinks.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the invention will be described in detail with reference to the accompanying drawings to enable those skilled in the art to easily implement the invention.

Figure 2:
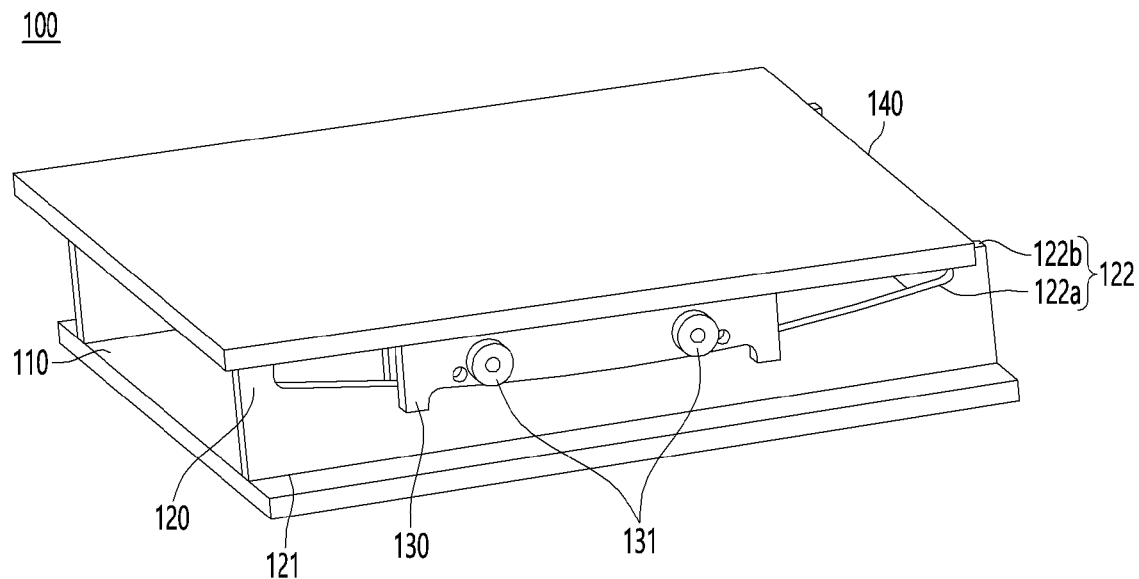
FIG. 2 shows a support assembly according to a first embodiment of the invention.

FIG. 2 shows a support assembly 100 according to a first embodiment of the invention.

Referring to FIG. 2, the support assembly 100 according to the first embodiment of the invention may comprise a lower frame 110, a guide frame 120, a connection frame 130, and an upper frame 140.

First, the lower frame 110 according to the embodiment of the invention may be configured to be mountable on one surface of a moving object (not shown). Here, according to the embodiment of the invention, the moving object may refer to an object that moves autonomously or heteronomously, and may include, for example, a robot, a car, a ship, and the like.

According to the embodiment of the invention, a surface parallel to a ground surface may be formed or disposed at one side of the moving object, which will be referred to as one surface of the moving object. For example, when the moving object is a robot for serving food and/or drinks, a tray disposed at one side of the moving object may correspond to the one surface of the moving object.

According to the embodiment of the invention, a fixing member (not shown) may be formed on a lower surface of the lower frame 110. According to the embodiment of the invention, the fixing member may function to fix between the lower surface of the lower frame 110 and the one surface of the moving object. According to the embodiment of the invention, the fixing member may be formed of, but is not necessarily limited to, an adhesive such as a double-sided tape, and may also be formed of a magnet, Velcro, or the like.

Next, one end 121 of the guide frame 120 according to the embodiment of the invention may be coupled to an upper surface of the lower frame 110. Here, the guide frame 120 according to the embodiment of the invention may be configured as a pair, and the pair of guide frames 120 may be disposed to face each other on the lower frame 110.

According to the embodiment of the invention, at least a part of another end 122 of the guide frame 120 may be curved toward where the lower frame 110 is located (i.e., toward the ground surface). Specifically, according to the embodiment of the invention, the other end 122 of the guide frame 120 may include a first part 122a that is curved toward where the lower frame 110 is located and a second part 122b that is not curved toward where the lower frame 110 is located. According to the embodiment of the invention, the second part 122b may be formed at each of both ends of the first part 122a, and the width of the first part 122a may be greater than a sum of the widths of the second parts 122b. Meanwhile, according to the embodiment of the invention, a step may be formed with a predetermined interval between the first part 122a and the second part 122b, and the function of the step will be described later.

Next, the connection frame 130 according to the embodiment of the invention may be configured as a pair like the guide frame 120, and the pair of connection frames 130 may be disposed to be seated on the first parts 122a included in the other ends 122 of the pair of guide frames 120 and face each other.

Specifically, the connection frame 130 according to the embodiment of the invention may include a plurality of rollers 131 spaced apart at a predetermined interval at one side, and may be configured as a double frame to support the plurality of rollers 131. According to the embodiment of the invention, the plurality of rollers 131 included at the one side of the connection frame 130 may be seated on the first part 122a included in the other end 122 of the guide frame 120, and may slide along the first part 122a in response to an external force being applied to the connection frame 130. For example, when the moving object is a robot for serving food and/or drinks, an external force may be applied to the connection frame 130 as the speed or direction of movement is changed while the robot is moving, and the external force may cause the plurality of rollers 131 to slide along the first part 122a.

Meanwhile, according to the embodiment of the invention, when the plurality of rollers 131 come into contact with the step formed between the first part 122a and the second part 122b while sliding along the first part 122a, the plurality of rollers 131 may not further slide in the same direction. That is, according to the embodiment of the invention, the step formed between the first part 122a and the second part 122b may prevent at least some of the plurality of rollers 131 from being separated from the first part 122a, and may further prevent the guide frame 120 and the connection frame 130 from being separated.

Meanwhile, according to the embodiment of the invention, the connection frame 130 may be formed in a bisymmetrical shape, and the plurality of rollers 131 may be disposed at positions spaced apart at the same interval on the left and right sides of a point corresponding to half the width of the connection frame 130.

Next, the upper frame 140 according to the embodiment of the invention may be coupled to another side of the connection frame 130. Here, according to the embodiment of the invention, the upper frame 140 and the other side of the connection frame 130 may be coupled such that a point corresponding to half the width of the upper frame 140 coincides with a point corresponding to half the width of the connection frame 130.

According to the embodiment of the invention, the upper frame 140 may be basically disposed parallel to the ground surface (or parallel to the lower frame 110), and may slide along the curved part (i.e., the first part 122a) of the guide frame 120 together with the connection frame 130 (specifically, the plurality of rollers 131 included in the connection frame 130) as an external force is applied. In this case, the upper frame 140 according to the embodiment of the invention is moved from its original position (i.e., the position parallel to the ground surface) to another position forming a predetermined angle with the ground surface. Thereafter, the upper frame 140 may return to the original position by means of gravity as the external force is removed. That is, the upper frame 140 according to the embodiment of the invention may move to the original position in response to the plurality of rollers 131 included in the connection frame 130 sliding along the curved part (i.e., the first part 122a) of the guide frame 120 by means of gravity.

According to the embodiment of the invention, objects such as food and/or drinks or dishes may be seated on an upper surface of the upper frame 140. Since the upper frame 140 may slide along the first part 122a to compensate for an external force when the external force is applied, and may return to the original position (i.e., the position parallel to the ground surface) when the external force is removed, the above objects may be stably supported by the support assembly 100 according to the embodiment of the invention.

Figure 3:
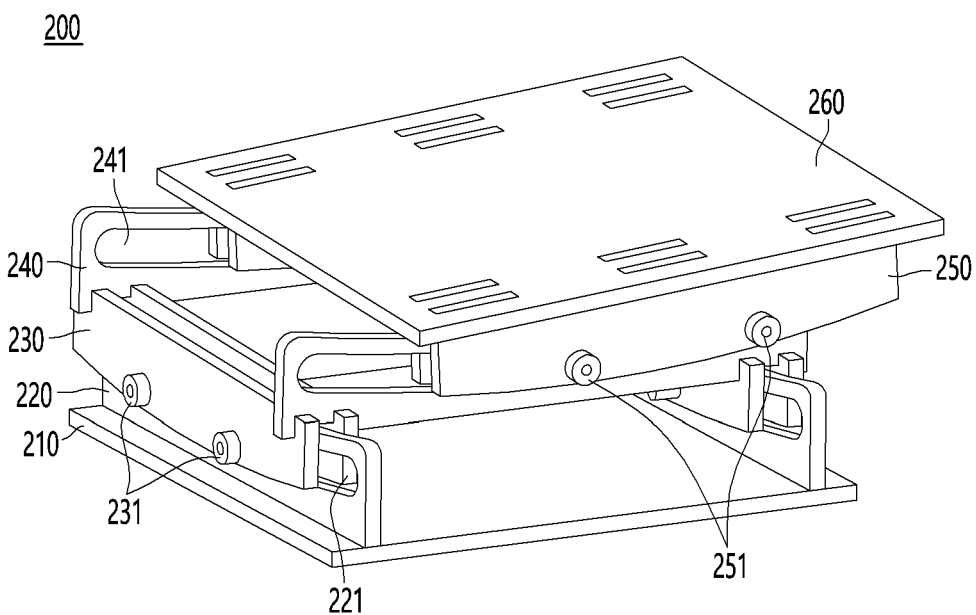
FIG. 3 shows a support assembly according to a second embodiment of the invention.

FIG. 3 shows a support assembly 200 according to a second embodiment of the invention.

Referring to FIG. 3, the support assembly 200 according to the second embodiment of the invention may comprise a lower frame 210, a first guide frame 220, a first connection frame 230, a second guide frame 240, a second connection frame 250, and an upper frame 260.

First, the lower frame 210 according to the embodiment of the invention may be configured to be mountable on one surface of a moving object (not shown). Since the configuration and function of the lower frame 210 according to the embodiment of the invention are the same as those of the lower frame 110 according to the first embodiment of the invention as described above, a detailed description thereof will be omitted.

Next, the first guide frame 220 according to the embodiment of the invention may be coupled to an upper surface of the lower frame 210. Here, the first guide frame 220 according to the embodiment of the invention may be configured as a pair, and the pair of first guide frames 220 may be disposed to face each other on the lower frame 210.

According to the embodiment of the invention, the first guide frame 120 may include a first hole 221 formed to be curved toward where the lower frame 210 is located (i.e., toward the ground surface). According to the embodiment of the invention, a plurality of first rollers 231 included in the first connection frame 230 to be described below may be seated in the first hole 221, and the first hole 221 may form a path along which the plurality of first rollers 231 move.

Next, the first connection frame 230 according to the embodiment of the invention may be configured as a pair like the first guide frame 220, and the pair of first connection frames 230 may be disposed to be seated in the first holes 221 included in the pair of first guide frames 220 and face each other.

Specifically, the first connection frame 230 according to the embodiment of the invention may include a plurality of first rollers 231 spaced apart at a predetermined interval at one side, and may be configured as a double frame to support the plurality of first rollers 231. According to the embodiment of the invention, the plurality of first rollers 231 included at the one side of the first connection frame 230 may be seated in the first hole 221 included in the first guide frame 220, and may slide along the first hole 221 in response to an external force being applied to the first connection frame 230. For example, when the moving object is a robot for serving food and/or drinks, an external force may be applied to the first connection frame 230 as the speed or direction of movement is changed while the robot is moving, and the external force may cause the plurality of first rollers 231 to slide along the first hole 221.

Meanwhile, according to the embodiment of the invention, the first connection frame 230 may be formed in a bisymmetrical shape, and the plurality of first rollers 231 may be disposed at positions spaced apart at the same interval on the left and right sides of a point corresponding to half the width of the first connection frame 230.

Next, the second guide frame 240 according to the embodiment of the invention may be coupled to another side of the first connection frame 230. Here, the second guide frame 240 according to the embodiment of the invention may be configured as a pair like the first connection frame 230, and the pair of second guide frames 240 may be disposed to face each other on the pair of first connection frames 230.

According to the embodiment of the invention, the second guide frame 240 may include a second hole 241 formed to be curved toward where the lower frame 210 is located (i.e., toward the ground surface). According to the embodiment of the invention, a plurality of second rollers 251 included in the second connection frame 250 to be described below may be seated in the second hole 241, and the second hole 241 may form a path along which the plurality of second rollers 251 move.

Next, the second connection frame 250 according to the embodiment of the invention may be configured as a pair like the second guide frame 240, and the pair of second connection frames 250 may be disposed to be seated in the second holes 241 included in the pair of second guide frames 240 and face each other.

Specifically, the second connection frame 250 according to the embodiment of the invention may include a plurality of second rollers 251 spaced apart at a predetermined interval at one side, and may be configured as a double frame to support the plurality of second rollers 251. According to the embodiment of the invention, the plurality of second rollers 251 included at the one side of the second connection frame 250 may be seated in the second hole 241 included in the second guide frame 240, and may slide along the second hole 241 in response to an external force being applied to the second connection frame 250. For example, when the moving object is a robot for serving food and/or drinks, an external force may be applied to the second connection frame 250 as the speed or direction of movement is changed while the robot is moving, and the external force may cause the plurality of second rollers 251 to slide along the second hole 241.

Meanwhile, the second connection frame 250 according to the embodiment of the invention may be disposed to be perpendicular to the first connection frame 230. Accordingly, the direction in which the second connection frame 250 slides (specifically, the direction in which the plurality of second rollers 251 included in the second connection frame 250 slide along the second hole 241) may be perpendicular to the direction in which the first connection frame 230 slides (specifically, the direction in which the plurality of first rollers 231 included in the first connection frame 230 slide along the first hole 221).

Meanwhile, according to the embodiment of the invention, the second connection frame 250 may be formed in a bisymmetrical shape, and the plurality of second rollers 251 may be disposed at positions spaced apart at the same interval on the left and right sides of a point corresponding to half the width of the second connection frame 250.

Next, the upper frame 260 according to the embodiment of the invention may be coupled to another side of the second connection frame 250. Here, according to the embodiment of the invention, the upper frame 260 and the other side of the second connection frame 250 may be coupled such that a point corresponding to half the width of the upper frame 260 coincides with a point corresponding to half the width of the second connection frame 250.

According to the embodiment of the invention, the upper frame 260 may be basically disposed parallel to the ground surface (or parallel to the lower frame 110), and may slide omnidirectionally as an external force is applied. Specifically, the upper frame 260 according to the embodiment of the invention may slide along the first hole 221 of the first guide frame 220 together with the first connection frame 230 (specifically, the plurality of first rollers 231 included in the first connection frame 230), or slide along the second hole 241 of the second guide frame 240 together with the second connection frame 250 (specifically, the plurality of second rollers 251 included in the second connection frame 250), as an external force is applied. In this case, the upper frame 260 according to the embodiment of the invention is moved from its original position (i.e., the position parallel to the ground surface) to another position forming a predetermined angle with the ground surface. Thereafter, the upper frame 260 may return to the original position by means of gravity as the external force is removed. That is, the upper frame 260 according to the embodiment of the invention may move to the original position in response to at least one of the plurality of first rollers 231 included in the first connection frame 230 sliding along the first hole 221 by means of gravity and the plurality of second rollers 251 included in the second connection frame 250 sliding along the second hole 241 by means of gravity.

According to the embodiment of the invention, objects such as food and/or drinks or dishes may be seated on an upper surface of the upper frame 260. Since the upper frame 260 may slide along at least one of the first hole 221 and the second hole 241 to compensate for an external force when the external force is applied, and may return to the original position (i.e., the position parallel to the ground surface) when the external force is removed, the above objects may be stably supported by the support assembly 200 according to the embodiment of the invention.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A support assembly, comprising:
   a lower frame configured to be mountable on one surface of a moving object;
   a first guide frame coupled to an upper surface of the lower frame and provided with a first hole formed to be curved with a single curvature toward where the lower frame is located;
   a first connection frame configured such that one side includes a plurality of first rollers spaced apart at a predetermined interval and includes a pair of sidewalls disposed on opposite sides of the first hole, and the plurality of first rollers slide along the first hole;
   a second guide frame coupled to another side of the first connection frame and provided with a second hole formed to be curved with a single curvature toward where the lower frame is located;
   a second connection frame configured such that one side includes a plurality of second rollers spaced apart at a predetermined interval, and the plurality of second rollers slide along the second hole; and
   an upper frame coupled to another side of the second connection frame and configured to move in response to at least one of the plurality of first rollers sliding along the first hole and the plurality of second rollers sliding along the second hole,
   wherein the upper frame freely moves to a position forming a predetermined angle with a ground surface as an external force is applied, and freely moves to a position parallel to the ground surface as the external force is removed.

2. The support assembly of claim 1, wherein each of the first guide frame, the first connection frame, the second guide frame, and the second connection frame is configured as a pair, and the pair of first guide frames and the pair of first connection frames, and the pair of second guide frames and the pair of second connection frames are disposed to face each other, respectively.

3. The support assembly of claim 1, wherein the first connection frame is disposed to be perpendicular to the second connection frame so that a direction in which the plurality of first rollers slide is perpendicular to a direction in which the plurality of second rollers slide.

4. The support assembly of claim 1, wherein the first guide frame provided with the first hole is movable relative to the second guide frame provided with the second hole.

5. The support assembly of claim 1, wherein the second connection frame is configured such that the one side includes a pair of sidewalls disposed on opposite sides of the second hole.

* * * * *